Oct. 27, 1942.　　　M. H. HANSEN　　　2,299,980
SCALE
Filed Nov. 10, 1938　　　3 Sheets-Sheet 1
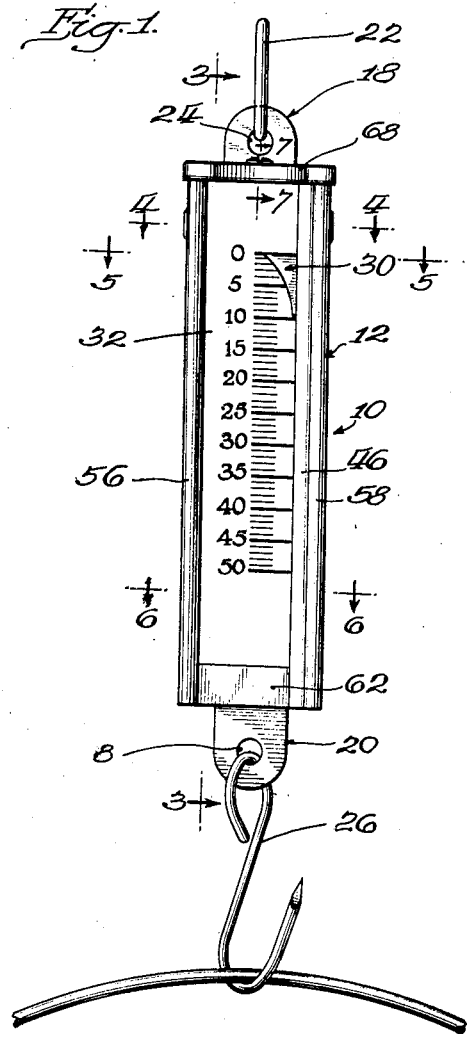
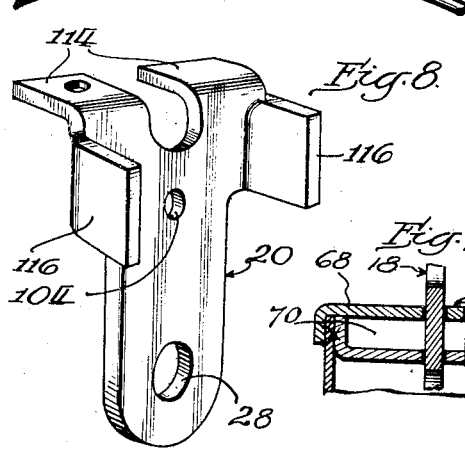
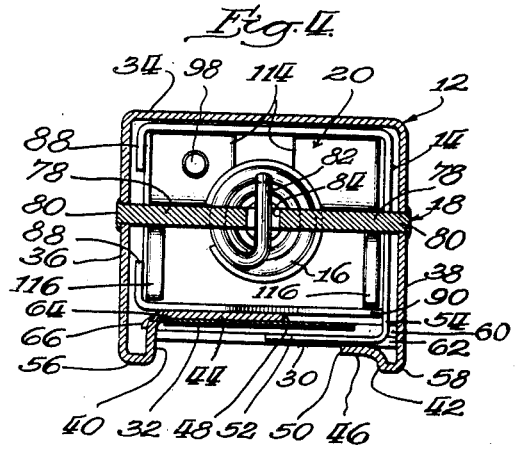
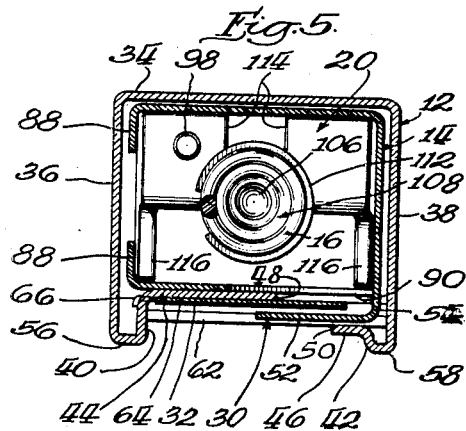
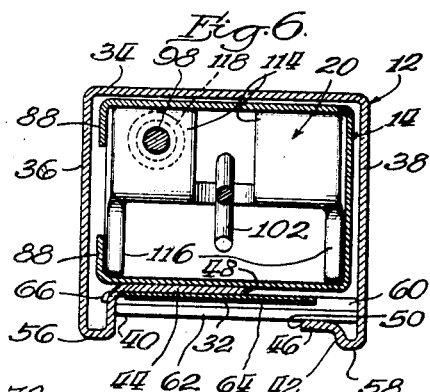
Inventor:
Marius H. Hansen
By Williams, Bradbury,
McCalet & Hinkle
Attys.

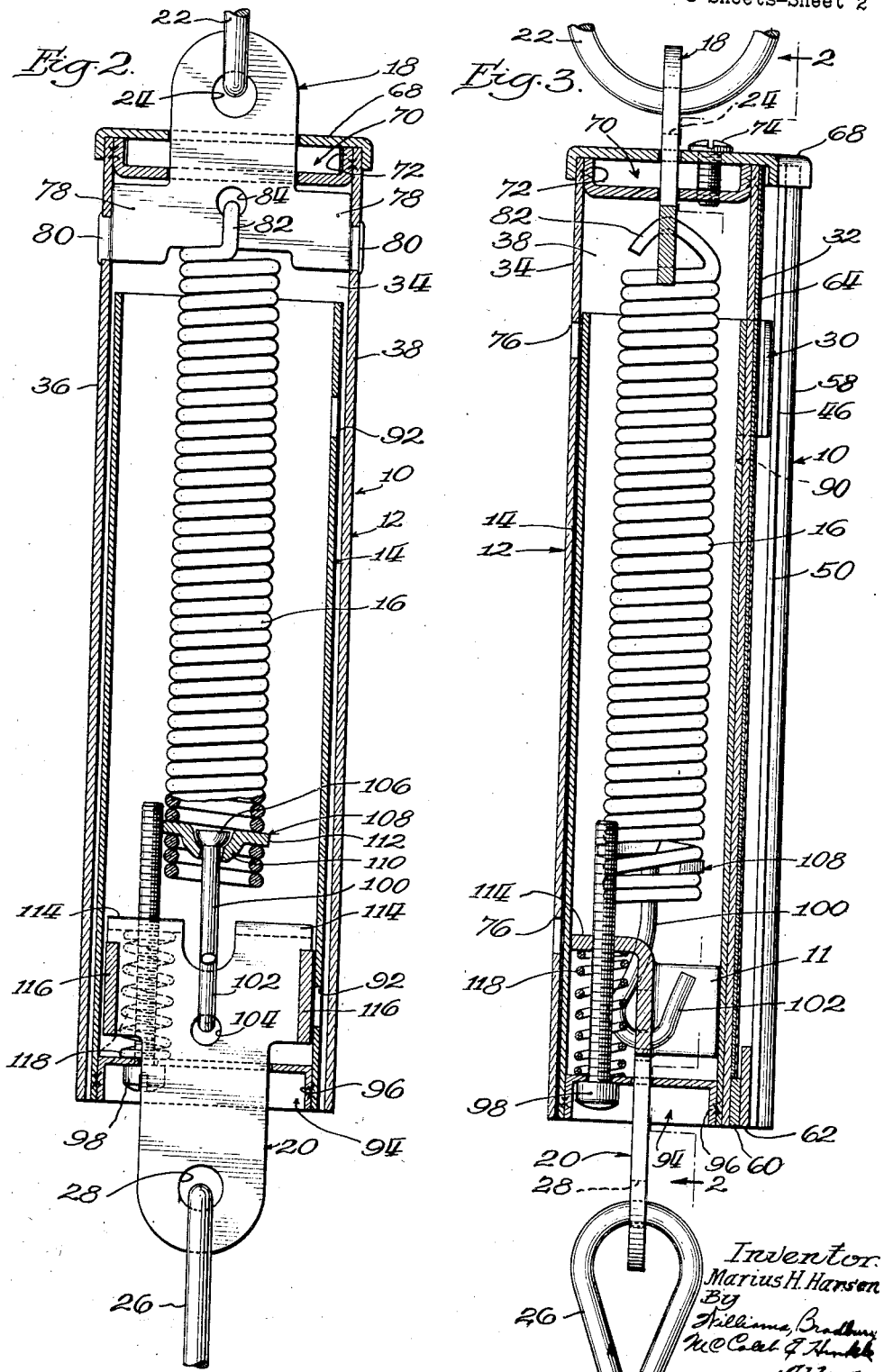

Oct. 27, 1942.        M. H. HANSEN         2,299,980
                          SCALE
                  Filed Nov. 10, 1938        3 Sheets-Sheet 3
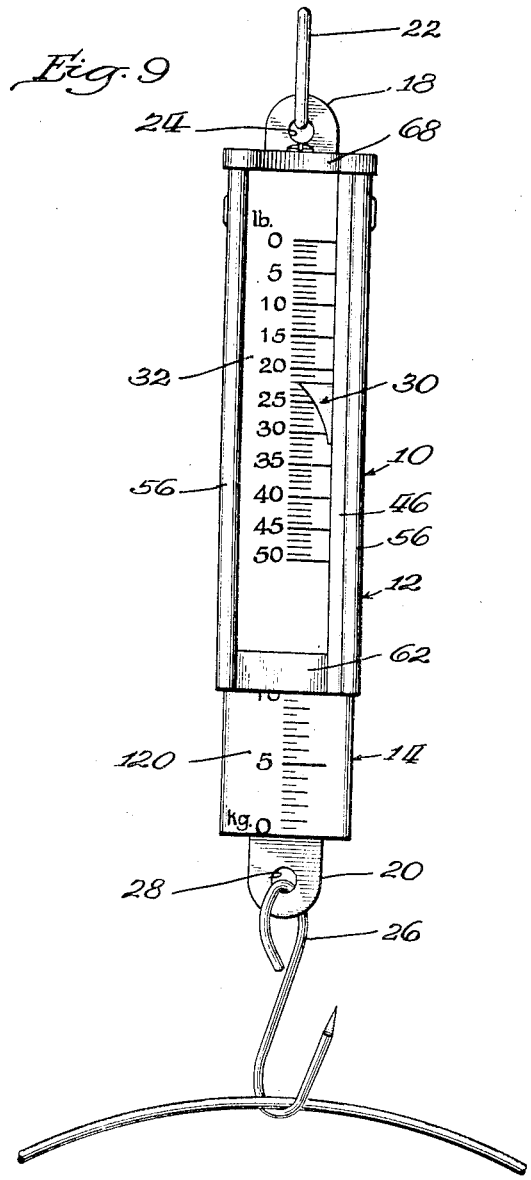
Inventor
Marius H. Hansen
By
Williams, Bradbury, McCoy & Hinkle
Attys.

Patented Oct. 27, 1942

2,299,980

UNITED STATES PATENT OFFICE 2,299,980

SCALE

Marius H. Hansen, Chicago, Ill., assignor to Hansen Scale Co., Chicago, Ill., a corporation of Illinois Application November 10, 1938, Serial No. 239,847

11 Claims. (Cl. 265—63)

My invention pertains to scales and particularly to scales adapted for domestic use.

My invention has for its primary object the provision of a new and improved scale characterized by its ruggedness and sturdiness, the ease and economy with which it may be manufactured, and its efficiency.

Another object of my invention is to provide a new and improved scale comprising a pair of relatively movable portions interconnected by resilient means, such as a spring, and so constructed and arranged with respect to each other that the two portions are guided in their relative movement by a considerable bearing area.

A further object of my invention is to provide a new and improved scale wherein the indicator or pointer, which is preferably formed integrally with one of the two relatively movable portions of the scale, cannot contact the other portion, thereby to avoid disfiguration of the dial and increase the accuracy of readings.

A further and more specific object of my invention is the construction of a scale of two relatively movable portions, each comprising a tubular member of polygonal cross section, preferably rectangular, and one of which has external dimensions slightly less than the internal dimensions of the other to provide the large bearing area referred to above. Construction of the two portions of the scale in the form of tubes enables them to be easily and economically fabricated from flat sheet metal.

A further and more specific object of my invention is to make the indicator integral with the inner tubular member, and to provide a relatively long longitudinally disposed slot in the outer tube through which the pointer extends to permit relative movement of the tubes and to indicate the extent of the relative movement.

Another object of my invention is to provide an integral index tube and indicator that is not only rugged in construction, but one which may be easily fabricated from flat sheet metal.

A further object of my invention is to provide a scale having a recessed dial whereby the indicator and dial are protected. This object I accomplish by indenting at least a portion of the polygonal outer tubular member.

Another object of my invention is to provide a new and improved scale wherein the indicator is movable over a major portion of the length of the outer tubular member, thereby to make the scale easier to read and likewise more accurate. This object I accomplish by mounting the spring interconnecting the two relatively movable portions within the inner portion and attaching the opposite ends of the spring to opposite ends of the members, i. e., to the lower end of the inner portion and to the upper end of the outer portion. This arrangement permits the use of a relatively long spring and as a result, the reading of the scale is made considerably easier, or by utilizing a spring of suitable characteristics the capacity of the spring may be increased.

Another object of my invention is to provide an improved arrangement for attaching the spring to the inner tubular member, (the index tube, as the inner member will be referred to hereinafter). The attaching arrangement of my invention comprises a ball-and-socket connection between the spring, which is of the helical type, and index tube, whereby axial elongation of the spring is assured. Furthermore, the ball-and-socket connection is so constructed that its position with respect to the spring may be varied to provide a factory adjustment of the scale.

Another, and one of the primary objects of my invention, is to provide a new and improved scale, the zero reading of which may be adjusted from the exterior thereof. This is a feature that has not heretofore been available in scales of the type herein under consideration, and one that provides distinct and material advantages. It enables the zero adjustment to be varied as desired, or necessitated by long continued use of the scale, or when a pan or the like is attached to the scale to receive an object to be weighed. After the pan has been attached to the scale, the scale may be adjusted to read zero, and consequently, a direct reading of the weight of the object placed upon the pan may be obtained.

A further object of my invention is to provide a simple arrangement whereby the aforesaid adjustment may be effected. This object is accomplished by providing a construction comprising means whereby the position of the index tube with respect to the spring may be varied, preferably by means accessible from the exterior of the scale.

Other objects and advantages of my invention will become apparent from the ensuing description of an embodiment thereof in the course of which reference is had to the accompanying drawings, in which:

Fig. 1 is a front elevational view of the scale of my invention;

Fig. 2 is a vertical longitudinal cross-sectional view taken along the line 2—2 of Fig. 3;

Fig. 3 is a vertical longitudinal cross-sectional view taken along the line 3—3 of Fig. 1. This view is taken along a plane lying at 180 degrees to the plane of the view of Fig. 2;

Fig. 4 is a horizontal transverse cross-sectional view taken along the line 4—4 of Fig. 1;

Fig. 5 is a horizontal cross-sectional view taken along the line 5—5 of Fig. 1;

Fig. 6 is a horizontal transverse cross-sectional view taken along the line 6—6 of Fig. 1;

Fig. 7 is a partial vertical cross-sectional view taken along the line 7—7 of Fig. 1;

Fig. 8 is a perspective view showing the details of construction of the combined lower spring and hook support of my invention; and Fig. 9 is a front elevational view of a modified form of my invention having dual indicating means.

The scale of my invention, indicated as a whole by reference character 10, comprises a pair of relatively long tubular members 12 and 14 of polygonal cross-section, preferably rectangular, dimensioned to permit longitudinal relative movement of one member within the other, and urged into telescoped relationship by a helical spring 16 having its upper end attached to the upper end of the outer tubular member 12 and its lower end to the inner tubular member 14.

The tubular members are formed from sheet metal, and, as will appear more fully hereinafter, among the features of my invention are included the specific constructions of these members whereby they may be made both simply and economically. The outer tubular member 12, hereinafter referred to as a casing, has secured to its upper end a combined ring and upper spring support 18, and the inner tubular member 14, hereinafter referred to as an index tube, has secured to its lower end a combined hook and lower spring support 20. Both of the last-mentioned elements are constructed and arranged materially to contribute to advantages inherent in the scale of my invention.

The scale is adapted to be suspended from the hand of the user or from any other suitable relatively fixed support by a ring 22 passing through an aperture 24 in the upper end of the combined ring and upper spring support 18. The article to be weighed is preferably attached to the scale by means of a hook 26 looped through an aperture 28 in the lower end of the combined hook and lower spring support.

Before proceeding with a detailed description of the scale, it is deemed advisable to state that relative movement of the two tubular portions of the scale is indicated by a pointer 30 of a generally triangular shape and formed integrally with the index tube 14. A dial 32 provided with suitable indicia is co-operatively associated with the pointer so that when an article to be weighed is attached to the hook and the scale suspended from the ring, the relative movement of the index tube longitudinally relative to the casing against the force exerted by the spring is indicated upon the dial by the pointer.

The casing 12 is preferably formed, as has been previously indicated, from a single piece of sheet material, and it is formed, in so far as its shape is concerned, to provide a recessed front for the pointer and dial, as may be most readily seen from Figs. 4 to 6, inclusive. The casing 12 comprises a flat back 34 and a pair of parallel spaced apart side walls 36 and 38. The recessed front wall is formed by bending the extensions of the side walls rearwardly, as indicated by reference characters 40 and 42, respectively, and then toward each other and parallel to the back 34, as indicated by reference characters 44 and 46, respectively. A slot in which the pointer 30 moves when the casing and index tube move relative to each other is provided by making the reverse bend 40 longer than the reverse bend 42, so that the portion 44 lies in a plane parallel to the back 34 somewhat nearer the latter than the plane in which the portion 46 lies, and by utilizing a piece of sheet metal such that the end 48 of the portion 44 is spaced from the end 50 of the portion 46 when the tube is completely formed.

Referring now more particularly to Figs. 4 and 5, it may be seen that the pointer 30 comprises a portion 52 disposed parallel to the portions 44 and 46 of the front wall of the casing and a portion 54 perpendicular thereto. It may be noted further that the pointer is entirely free from the casing so that when the casing and index tube move relative to each other, the pointer does not contact the casing or the dial. The result of this is an increased efficiency of the scale and the elimination of the disfiguration of the dial by the pointer.

The rigidity of the casing is enhanced by the recessed construction of the front wall described above, because the reverse bends in the wall structure provide a pair of column-like portions 56 and 58, which also add to the appearance of the scale.

The lower end of the casing is made rigid by a pair of cross members 60 and 62, preferably welded to each other and to the front portions 44 and 46 of the casing. The cross piece 62, which is located in front of the cross piece 60, also functions as a stop to prevent relative movement of the casing and index tube beyond a predetermined point, as best illustrated in Figs. 3 and 4.

The dial 32, which may be of metal or any other suitable material, is suitably attached to a relatively thin metal plate 64 attached to the outer casing immediately forward of the front wall portion 44. The lower end of the plate rests upon cross piece 60, and the plate itself is provided with a plurality of lugs 66 adapted to be passed through suitable apertures in the reverse bend 40 of the front wall of the casing. When the plate is inserted in place, the lugs 66 are adapted to be bent, as illustrated in Figs. 4 and 5, to secure the plate 64 to the casing. The plate 64 is additionally secured by an inverted cup-like cap plate 68 detachably secured to the upper end of the casing in a manner hereinafter to be described in detail.

A neat appearance is imparted to the scale by making the dial and plate of a width such that the right ends thereof extend laterally behind the front wall portion 46. The appearance is further enhanced by supporting the lower end of the plate upon the cross piece 60, which is somewhat narrower than cross piece 62, and extending the upper end of the plate above the lower extremity of the front downwardly extending flanges of cap plate 68.

Construction of the scale with a recess adapted to receive the dial and pointer protects the latter elements from contact with other objects, even when the scale is laid face downward. While I have described the dial 32 as being separate from the plate 64, it is to be understood that the indicia may be suitably formed directly upon this plate, in which case this plate would preferably be either an etched brass plate or a steel plate printed or lithographed.

The upper end of the tubular casing is closed not only by the cap plate 68 but also by a cup-like closure plate 70 having its upwardly extending flanges 72 spot welded to the walls of the casing. The use of a cup-like closure member permits ready spot welding thereof to the casing, as will be apparent to those skilled in the art merely from an inspection of Fig. 3.

The cap plate 68 is removably attached to the casing structure by a screw 74 extending through an aperture in the cap plate into threaded engagement with the closure plate 70.

From Fig. 3 it may be seen that the back of the casing is provided with a pair of spaced apart apertures 76 which are utilized in properly positioning the casing when it is being formed.

The combined ring and upper spring support is formed of a single piece of flat metal having generally the form of an inverted capital "T" when in assembled position. The horizontal sections 78 thereof have portions abutting against the inner side walls of the casing and reduced portions 80 thereof pass through suitable apertures in the side walls and are peened, as indicated in Fig. 2, securely to fasten the support in place. The support is conveniently assembled in place before the closure members 68 and 70 are secured to the casing at which time the support may be sprung into position, the outer casing having sufficient resiliency to permit this.

From Figs. 2 and 3 it may be seen that the closure members 68 and 70 are apertured so that they may be slid into assembled relationship with the casing over the upper end of the combined ring and upper spring support.

The upper end of the spring 16 is supported by the combined ring and upper spring support. It is preferred that the spring terminate in a central loop 82, which is passed through an aperture 84 in the lower end of the support. The spring support and the terminal loop of the spring are so located and arranged that the spring is mounted substantially centrally of the scale.

The index tube is also fabricated from a single piece of flat sheet metal. Three of the walls of the index tube are substantially solid, while the fourth consists of relatively short end portions 88 facing each other. As previously described, the pointer 30 is made integrally with the index tube, and one of the features of my invention is the specific manner in which the pointer is made. The pointer is stamped in the upper right-hand corner of the tube, as best indicated in Figs. 3, 4, and 5. The stamping operation is facilitated by first slitting the tube, as indicated at 90, immediately below the pointer proper. The index tube is also provided with a pair of spaced apart apertures 92 in one of its side walls in order to facilitate positioning thereof during its formation.

The lower end of the index tube is closed by an inverted cup-like closure member 94 having downwardly extending flanges 86 which are spot welded to the side walls of the tube. The closure member is provided with a plurality of apertures through one of which the combined hook and lower spring support extends and the other of which is provided for a relatively long screw 98 in threaded engagement with the combined hook and lower spring support by means of which the position of the index tube relative to the spring may be adjusted from the exterior of the scale for a purpose and in a manner to be described shortly.

The connection of the lower end of the spring 16 to the lower spring support 20 is designed to provide a factory adjustment of the relative position of the index tube and spring as well as to insure axial elongation of the spring.

The lower end of the spring 16 is connected to the lower spring support by a link 100 terminating at one end in a hook 102 looped through a centrally located aperture 104 in the support and at its other end in a hemispherical knob 106. The spring is adjustably secured to the link 100 by the knob 106 and by a circular plate 108, the central portion 110 of which is concave and apertured to form a ball-and-socket connection together with the knob 106. The peripheral flange 112 of the plate 108 is of a spiral form, as may be noted from Figs. 2 and 3, particularly the latter, in order that the plate may be threaded along the spring to provide the factory adjustment mentioned above.

The combined hook and lower spring support is guided in its relative movement with respect to the index tube by a pair of coplanar horizontally disposed lugs 114 adapted to abut against the rear wall of the index tube and a pair of parallel vertically disposed lugs 116 adapted to abut against the front wall of the index tube. The movement of the support is guided also by the apertured closure plate 94 through which the lower end of the support extends.

The position of the lower spring support is adjusted by rotation of screw 98, the head of which is outside the index tube where it is readily accessible for adjustment by suitable means such as a small screw driver or the like. The screw passes freely through its associated aperture in closure plate 94 and is in threaded engagement with one of the horizontally disposed lugs 114. Proper positioning of the lower spring support is insured by a small helical spring 118 surrounding the screw 98 and compressed between the closure member 94 and the aforesaid one of the horizontally disposed lugs 114. This spring possesses a strength such that the combined hook and lower spring support is always maintained in adjusted position, that is, it remains fixed relative to the index tube within the normal range of adjustments and for the capacity of the scale. The spring 118 causes sufficient frictional engagement between the threads of the screw 98 and the lower spring support to prevent accidental displacement of the adjusted position of the parts.

From the above detailed description it may be seen that the relatively movable tubular portions of the scale of my invention may be readily fabricated from sheet metal and that the scale, as a unit, may be readily assembled to form a sturdy and efficient unit. The length of the tubular members and the location of one within the other provide a considerable bearing area, and the construction of the tubular members with a polygonal cross section, preferably rectangular, provides an arrangement restraining relative rotational movement of the two portions. This fact coupled with the fact that the pointer, which is formed integrally with the index tube, is spaced from the casing obviates the danger of the pointer contacting the casing or the dial.

The pointer of the scale is movable over the major portion of the length of the scale as distinguished over prior scales in which the pointer moves over only a limited portion, usually a half, of the length of the scale. This advantageous feature is provided by constructing the scale of two tubular portions that are telescopically movable relative to each other. Furthermore, a relatively long spring can be used to provide a more readily readable scale or, if desired, a scale of greater capacity.

If the scale is utilized to weigh articles having a weight in excess of the capacity of the scale, the relative movement of the index tube and casing is stopped before the spring is stretched beyond a safe limit. This safety feature is obtained by arranging the cross piece 62 so that the pointer engages it upon predetermined relative movement of the index tube and casing. The pointer is relatively heavy and consequently is not damaged if an attempt is made to weigh excessively heavy objects.

Factory adjustment of the scale is obtained first by properly positioning the circular plate 108 with respect to the helical spring and by means of the external adjustment, which is made through the screw 98. The latter, particularly, enables the scale to be adjusted to read zero when nothing is attached to the scale either initially or after long continued use of the scale.

When it is desired to weigh some article or material, which must be held in a receptacle or the like, the receptacle can be placed on the hook and the scale made to read zero by adjustment of the screw 98. Thereafter, the article or material to be weighed may be placed in the receptacle and the scale reads directly the weight of the material.

In Figure 9 I have illustrated a modified form of my invention. The sole difference between this form of my invention and that shown in Figures 1 to 8 inclusive is that the embodiment shown in Figure 9 has dual indicating means comprising the dial 32 which is identical with that of the previous embodiment and which may be marked off to indicate pounds, and a second dial 120 which is carried on the inner tubular member 14 and cooperates with the lower edge of the cross member 62 to indicate the relative positions of the outer and inner tubular members 12 and 14 respectively, and thus to indicate the weight of the article being measured.

The dial 120 is preferably marked in kilograms or some other weight units different from those used on the dial 32. The dial 120 may be either marked directly on the tubular member 14 or may be in the form of a sheet of paper or other suitable material cemented or otherwise suitably secured to the tubular member 14. By providing my improved scale with two dials, the same scale is made equally available for use in this country and in the South American countries and other countries which measure weights in kilograms. It will, of course, be understood that the scales 32 and 120 may be marked in any other units of weight in lieu of pounds and kilograms. It is also to be noted that the same adjustment applies equally to both scales.

While I prefer to use sheet metal in the construction of the scale, other materials may be used without loss of many of the advantages of my invention. Furthermore, it should be understood that the preferred embodiment of my invention described in detail herein is merely illustrative and should not be construed to limit the invention in any way.

What I claim as new and desire to secure by Letters Patent is as follows:

1. In a scale, the combination including, a relatively long tubular member of polygonal cross section, a second relatively long tubular member of similar cross section, said members being dimensioned to permit longitudinal and substantially to restrict angular relative movement of one member within the other, the telescoped portions of said tubular members being in close spacial relationship to each other to provide a bearing surface throughout said portions, means for indicating the extent of the relative movement between said members, said means including a longitudinally disposed slot on the outer member, indicia adjacent said slot, and a pointer consisting of a portion forming part of and extending outward from the inner member through said slot and another portion substantially parallel to the adjacent side of the outer member, said closely spaced tubular members cooperating to space said pointer from the outer member and said indicia, and spring means interconnecting said tubular members.

2. In a scale, the combination including, a relatively long tubular member of polygonal cross section, a second relatively long tubular member of similar cross section dimensioned for longitudinal movement only relative to and within the first, the telescoped portions of said tubular members being in close spacial relationship to each other to provide a bearing surface throughout said portions, spring means interconnecting said members adapted to permit relative movement thereof throughout the major portion of the lengths of said members, and means for indicating the relative movement of said members, said means including a longitudinally disposed slot in the outer member, indicia adjacent said slot, and a pointer having a portion extending outward from the inner member through said slot and another portion close and substantially parallel to the adjacent side of the outer member formed integrally with the inner member and located substantially at the upper end of the inner member, said closely spaced tubular members cooperating to space said pointer from the outer tubular member and said indicia.

3. In a scale, the combination including, a relatively long tubular member, a second relatively long tubular member of similar cross section dimensioned for movement relative to and within the first, spring means interconnecting said members adapted to urge said members into telescoped relationship, means including a slot in one member formed by terminating adjacent sides thereof spaced apart from each other and in different planes and a pointer on the other extending into said slot for indicating the relative movement between said members, and means for limiting the relative movement between said members, said means including structure securing said adjacent sides together and extending across the slot to form a stop adapted to be engaged by said pointer.

4. In apparatus of the type described, an index tube adapted to be connected to a spring and to support article receiving means, comprising an integral sheet structure formed into the shape of an open ended tube of substantially rectangular cross section, having a portion near one end thereof offset from the remainder to form a pointer, a closure member for the other end thereof, a combined article receiving means and spring support movably mounted inside said tube, and means extending outside said closure member adjustably securing said spring support to said tube.

5. In a scale, the combination including, a casing of substantially tubular form, a pointer carrying index tube dimensioned for movement relative to and within said casing, a spring located within said index tube and attached at its upper end to the upper end of the casing, a spring support to which the lower end of said spring is attached mounted for longitudinal movement in the lower end of said index tube, said spring support abutting a plurality of points on the inner wall of said index tube, and means accessible from the exterior of said index tube and mounted for rotary movement only with respect to said tube for moving said support longitudinally with respect to said tube.

6. In a scale, the combination including, a casing of tubular form having a substantially rectangular cross section, a pointer carrying index tube dimensioned for movement relative to and within the casing, said tube being open at its upper end and having its lower end closed by a multi-apertured plate, a spring located within said index tube, means attaching the upper end of the spring to the upper end and centrally of said casing, a spring support movably mounted in the lower end of said index tube, said support comprising a flat piece of metal having oppositely extending lugs adapted to abut against the interior of the index tube and a portion extending through one of the apertures in said plate, means for attaching the lower end of the spring to said support, and means for adjusting the position of said support relative to the tube externally of said tube, said last-mentioned means including a member in threaded engagement with one of said lugs and extending outside said tube through another of the apertures in said plate, and resilient means interposed between the tube and support co-operatively associated with the member in threaded engagement with said plate for maintaining the latter in adjusted position.

7. In apparatus of the type described comprising a spring and a tubular member attached to and urged to a predetermined position by said spring, the combination including, a spring support adjustably mounted inside said member, an apertured closure for said tubular member, and means in threaded engagement with said support and extending through the aperture in said closure member for adjusting the position of said spring support with respect to said tubular member.

8. In a scale of the class described, the combination, including a relatively long tubular member having a slot therein, a second relatively long tubular member, a pointer on the second tubular member, one of said members having internal dimensions slightly greater than the external dimensions of the other whereby said members are capable of movement relative to each other, resilient means interconnecting said tubular members normally to hold them in telescoped relation, and dual indicating means for simultaneously indicating weights in different measuring systems, said indicating means comprising indicia calibrated in different units inscribed, respectively, on juxtaposed faces of the telescopically movable members, said pointer extending through said slot and cooperating with the indicia of the slotted member to indicate the relative movement between said tubular members, said indicia on the pointer carrying member being read with respect to a point of reference on said slotted member.

9. In a scale, the combination including, a pair of members so constructed and arranged that they are movable telescopically with respect to one another, resilient means interconnecting said members, means for supporting one end of said resilient means within and for movement relative to the inner one of said members, means including a portion of said inner member inset from the remainder thereof, and adjusting means mounted upon said inset portion and extending therethrough for effecting relative movement between said resilient means and said supporting means.

10. In a scale, the combination including, a pair of members so constructed and arranged that they are movable telescopically with respect to one another, resilient means for interconnecting said members, means for supporting one end of said resilient means mounted within one of said members for longitudinal movement with respect thereto, means for adjustably connecting one end of said resilient means to said supporting means, and means accessible from the exterior of said member for effecting longitudinal movement of said supporting means, said last-mentioned means being off center with respect to said resilient means.

11. In a scale, the combination including, a relatively long tubular member, a face portion for said member, said face portion comprising inturned portions terminating apart from each other and lying in different planes to form a slot therebetween, indicia supported by one of the inturned portions, a second relatively long tubular member dimensioned for movement relative to and within the first, spring means interconnecting said members adapted to urge said members into telescoped relationship, and a pointer on the inner tubular member extending through said slot to cooperate with said indicia for indicating the relative movement between said members.

MARIUS H. HANSEN.

CERTIFICATE OF CORRECTION.

Patent No. 2,299,980. October 27, 1942.

MARIUS H. HANSEN.

It is hereby certified that error appears in the above numbered patent requiring correction as follows: In the grant, lines 2 and 13, and in the heading to the printed specification, line 4, name of assignee, for "Hansen" read --Hanson--; and that the said Letters Patent should be read with this correction therein that the same may conform to the record of the case in the Patent Office.

Signed and sealed this 29th day of December, A. D. 1942.

Henry Van Arsdale,
Acting Commissioner of Patents.

Seal)